United States Patent [19]

Owa

[11] Patent Number: 5,379,119

[45] Date of Patent: Jan. 3, 1995

[54] VIDEO DISK RECORDING APPARATUS WHEREIN THE FREQUENCY OF THE CARRIER IS LOWERED AND THE FREQUENCY RANGE OF THE INFORMATION SIGNAL IS NARROWED WHEN A RECORDING LASER BEAM IS POSITIONED AT AN EXTENDED RECORDING AREA OF THE DISK

[75] Inventor: Hideo Owa, Kanagawa, Japan

[73] Assignee: Sony Corporation, Tokyo, Japan

[21] Appl. No.: 629,245

[22] Filed: Dec. 18, 1990

[30] Foreign Application Priority Data

Dec. 27, 1989 [JP] Japan .................. 1-339235

[51] Int. Cl.⁶ .................. H04N 9/79; G11B 20/06
[52] U.S. Cl. .................. 358/310; 358/330; 358/342; 358/322; 358/335; 360/30; 360/33.1
[58] Field of Search .............. 358/330, 310, 320, 322, 358/321, 335, 337, 339, 342; 360/33.1, 36.2; 369/116, 32; H04N 9/79, 9/80, 9/81, 5/76, 5/84, 5/85

[56] References Cited

U.S. PATENT DOCUMENTS

| | | | |
|---|---|---|---|
| 4,357,635 | 11/1982 | Hasegawa | 360/48 |
| 4,419,750 | 12/1983 | Howe | 358/342 |
| 4,532,621 | 7/1985 | Nakagawa | 369/111 |
| 4,550,347 | 10/1985 | Nakamuta | 358/342 |
| 4,754,339 | 6/1988 | Nagai et al. | 358/310 |
| 4,766,502 | 8/1988 | Mashimo | 358/322 |
| 4,779,143 | 10/1988 | Oku et al. | 358/322 |
| 4,896,311 | 1/1990 | Ishihara | 369/50 |
| 4,918,677 | 4/1990 | Ashinuma et al. | 369/32 |
| 4,984,227 | 1/1991 | Yoshimaru | 369/32 |
| 5,010,539 | 4/1991 | Terashima et al. | 358/342 |
| 5,083,212 | 6/1992 | Owa et al. | 358/319 |
| 5,142,521 | 8/1992 | Terashima et al. | 369/32 |

FOREIGN PATENT DOCUMENTS

| | | |
|---|---|---|
| 348037 | 1/1979 | Austria . |
| 0158067 | 2/1985 | European Pat. Off. ...... G11B 7/013 |
| 0218214 | 10/1985 | European Pat. Off. ...... G11B 7/013 |
| 0287316A2 | 10/1988 | European Pat. Off. ....... H04N 9/81 |
| 0287316 | 10/1988 | European Pat. Off. . |
| 58-062987 | 4/1983 | Japan .................. H04N 5/92 |
| 63-205819 | 8/1988 | Japan .................. G11B 7/00 |

OTHER PUBLICATIONS

A. H. Firester, I. Gorog, J. P. Russell, J. J. Gibson, C. B. Carroll, and W. R. Roach: "Optical Recording Techniques for the RCA VideoDisc," RCA Laboratories, Princeton, N.J. 08540, RCA Review, vol. 39, Sep. 1978, pp. 427–471.

*Primary Examiner*—Tommy P. Chin
*Assistant Examiner*—Khoi Truong
*Attorney, Agent, or Firm*—Limbach & Limbach

[57] ABSTRACT

An apparatus for recording an information signal on a disk by a laser beam is comprises of a rotating device for driving the disk with a constant angular velocity, a modulator for frequency-modulating the information signal in a predetermined manner, a control circuit for controlling the laser beam by the frequency-modulated information signal, and a record circuit for changing the characteristics of the information signal in accordance with the position of the laser beam on the disk.

8 Claims, 3 Drawing Sheets

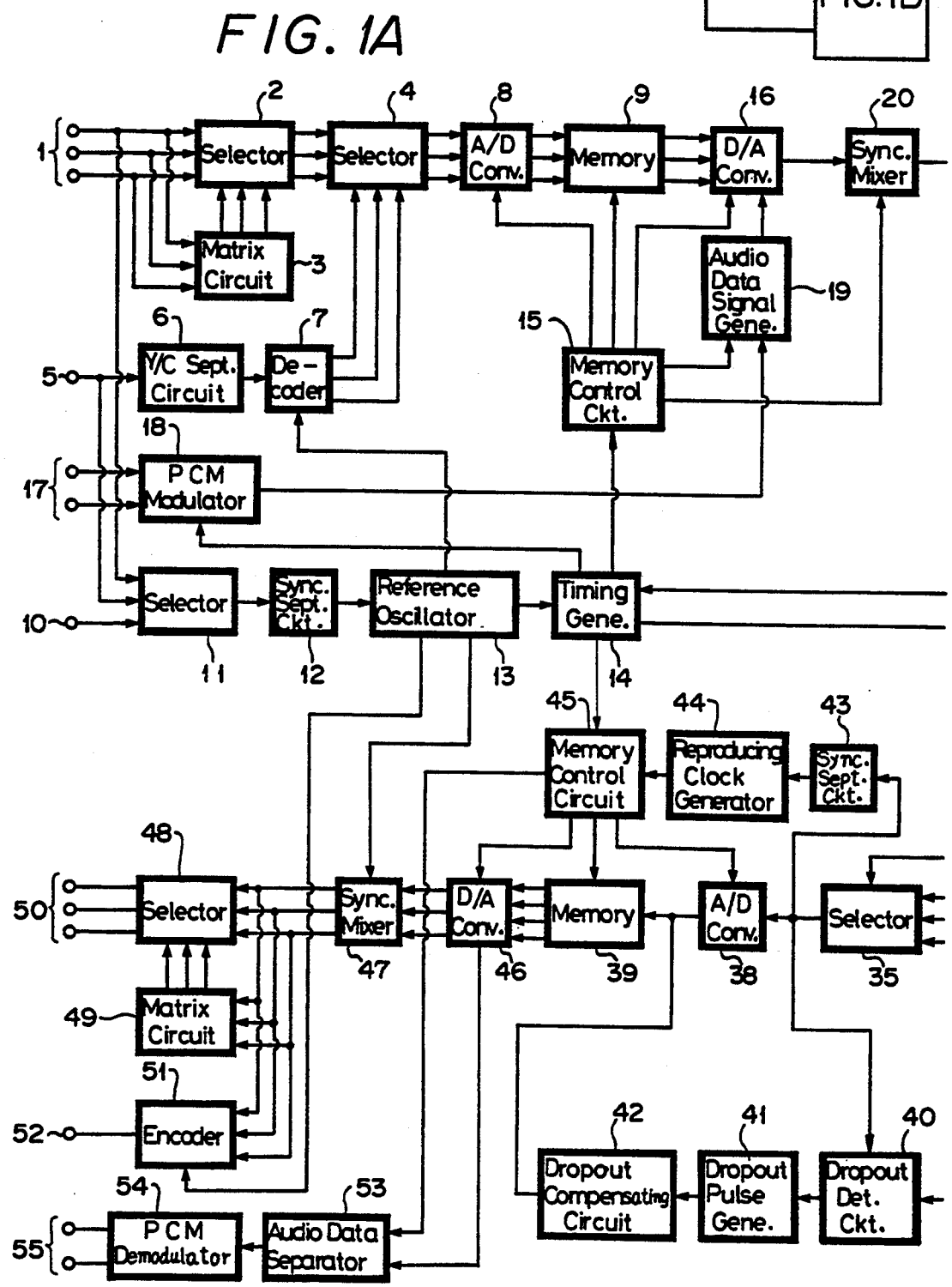

VIDEO DISK RECORDING APPARATUS WHEREIN THE FREQUENCY OF THE CARRIER IS LOWERED AND THE FREQUENCY RANGE OF THE INFORMATION SIGNAL IS NARROWED WHEN A RECORDING LASER BEAM IS POSITIONED AT AN EXTENDED RECORDING AREA OF THE DISK

BACKGROUND OF THE INVENTION

1. Field of the Invention

The present invention generally relates to optical disk apparatus and, more particularly, to an optical disk apparatus which is used to record and/or reproduce a color video signal or the like.

2. Description of the Prior Art

Conventionally, an optical disk apparatus is proposed to record and/or reproduce a color video signal and an audio signal by using an optical disk (see Japanese Patent Laid-Open Gazette No. 63-257395 and U.S. patent application Ser. No. 07/180,340).

In the existing optical disk apparatus, a color video signal and an audio signal can be recorded and/or reproduced during a period of time of 24 minutes by using a single side of an optical disk of 30 cm in diameter which is rotated at a constant angular velocity.

Incidentally, an optical disk apparatus which is exclusive for reproduction, i.e. so-called optical video disk player can reproduce the color video signal and the audio signal from the single side of the optical disk of 30 cm in diameter during a period of time of 30 minutes. Accordingly, the above-mentioned playback time, 24 minutes is shorter than the playback time of 30 minutes by 20%.

For this reason, the user utilizing both the above-mentioned recording and reproducing type apparatus and the apparatus exclusive for playback suffers from great disadvantage and this causes a serious problem to the user in use because the playback times are different though the operation procedures are the same.

Incidentally, in the above-mentioned recording and reproducing type optical disk apparatus, the innermost track of the optical disk in which the recording and reproduction are performed is defined from the position of the radius of 70 mm. This standard is made in order to keep the quality of the reproduced picture higher than the predetermined image quality.

OBJECTS AND SUMMARY OF THE INVENTION

Accordingly, it is an object of the present invention to provide an improved optical disk apparatus which can eliminate the aforenoted shortcomings and disadvantages encountered with the prior art.

More specifically, it is an object of the present invention to provide an optical disk apparatus in which a recorded information of a desired duration can be reproduced satisfactorily.

It is another object of the present invention to provide an optical disk apparatus in which the recording and reproducing times can be extended by a simple structure.

It is a further object of the present invention to provide an optical disk apparatus in which the change of image quality can be concealed.

It is yet a further object of the present invention to provide an optical disk apparatus in which the recording and reproduction can be carried out continuously.

As an aspect of the present invention, an apparatus for recording an information signal on a disk by a laser beam is comprised of a rotating device for driving the disk with a constant angular velocity, a modulator for frequency-modulating the information signal in a predetermined manner, a control circuit for controlling the laser beam by the frequency-modulated information signal, and a record circuit for changing the characteristics of the information signal in accordance with the position of the laser beam on the disk.

The above, and other objects, features and advantages of the present invention will become apparent in the following detailed description of an illustrative embodiment to be taken in conjunction with the accompanying drawings, in which like reference numerals are used to identify the same or similar parts in the several views.

BRIEF DESCRIPTION OF THE DRAWINGS

FIGS. 1, 1A and 1B are block diagrams showing an embodiment of a video disk recording apparatus according to the present invention;

DETAILED DESCRIPTION OF THE PREFERRED EMBODIMENT

An embodiment of the video disk recording apparatus according to the present invention will hereinafter be described with reference to the accompanying drawings.

Figure 1B:
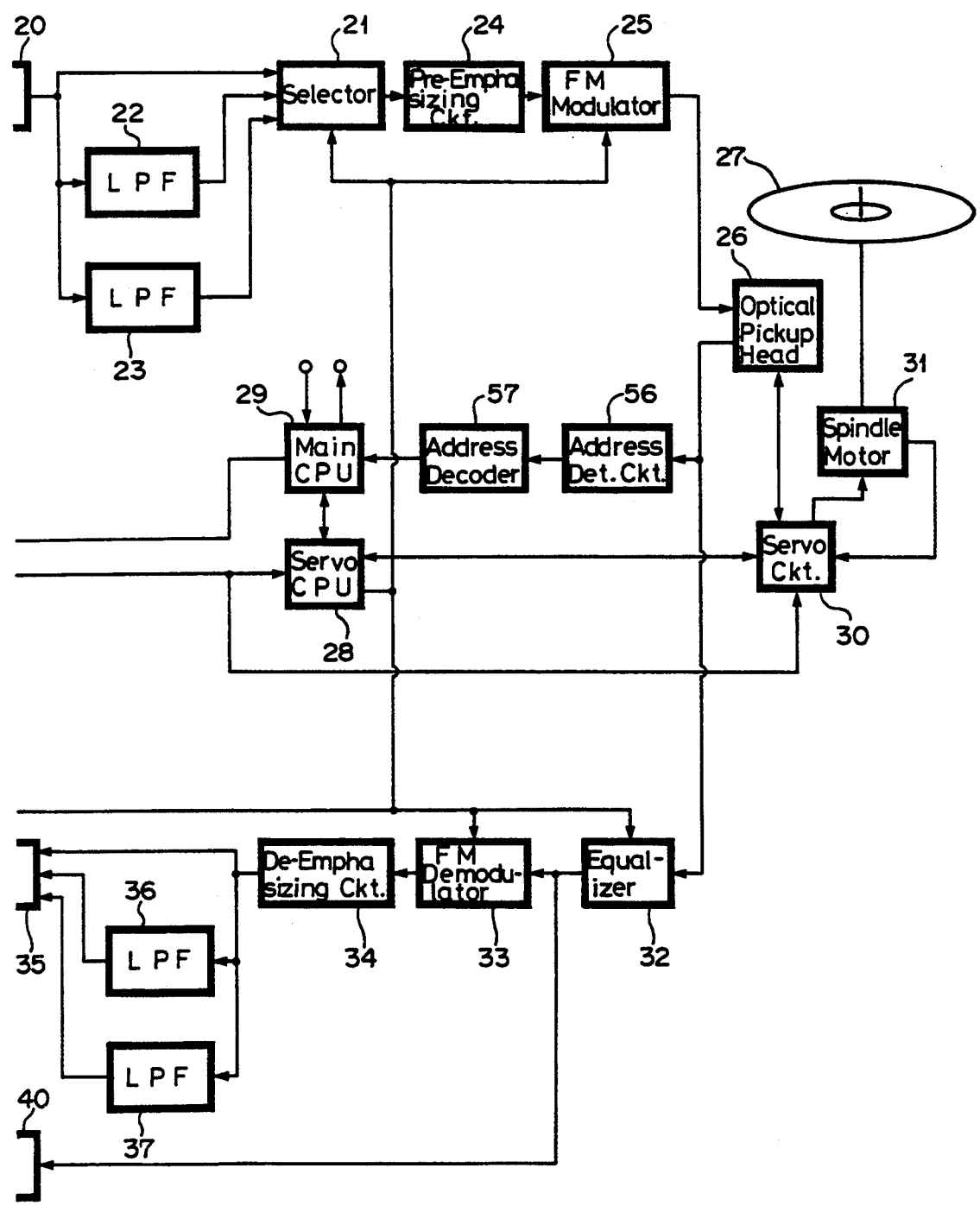

FIG. 1 (formed of FIGS. 1A and 1B) is a block diagram showing an overall arrangement of an embodiment of the video disk recording apparatus according to the present invention.

Referring to FIG. 1, an input terminal 1 is supplied with, for example, a luminance signal and two color difference signals of a component video signal or three primary color signals. The luminance/color difference signals are supplied to a selector 2, and the three primary color signals are supplied to a matrix circuit 3, in which they are converted to luminance/color difference signals and fed to the selector 2. The signal selected by the selector 2 is supplied to a selector 4.

On the other hand, a composite color video signal is supplied to an input terminal 5. This composite color video signal is supplied through a luminance/chroma signal separating circuit 6 to a decoder 7, and a signal converted into a luminance/color difference signal is supplied to the selector 4.

A signal selected by this selector 4 is supplied to an analog-to-digital (A/D) converter 8, and a converted digital signal is supplied to a memory 9.

Further, the luminance signal or the green primary color signal from the input terminal 1, the color video signal from the input terminal 5 and a reference video signal supplied to an input terminal 10 are supplied to a selector 11, and a signal selected by this selector 11 is supplied to a synchronizing (sync.) separating circuit 12. The synchronizing signal separated thereby is supplied to a reference oscillator 13, and a reference synchronizing signal and a clock signal synchronized with the synchronizing signal are generated. A burst gate timing signal from the reference oscillator 13 is supplied to a decoder 7.

Also, the signal from the reference oscillator 13 is supplied to a timing generating circuit 14, and a timing signal from the timing generating circuit 14 is supplied to a memory control circuit 15. The A/D converter 8, the memory 9 and an D/A converter 16 to which the signal from the memory 9 is supplied are driven by control signals from the memory control circuit 15.

Further, for example, right and left stereo audio signals are supplied to an input terminal 17, and then these stereo audio signals are supplied to a pulse code modulation (PCM) modulator 18, in which they are modulated to provide a predetermined audio data signal. This audio data signal is supplied to an audio data signal generating circuit 19, in which it is added with an arbitrary audio data synchronizing signal from the memory control circuit 15. A resultant signal from the audio data signal generating circuit 19 is supplied to the D/A converter 16. A signal signal from the D/A converter 16 is supplied to a synchronizing mixing circuit 20, wherein a total synchronizing signal from the memory control circuit 15 is mixed thereto.

Figure 2A:
FIGS. 2A and 2B are schematic diagrams showing a waveform format of a recording signal.
Figure 2B:
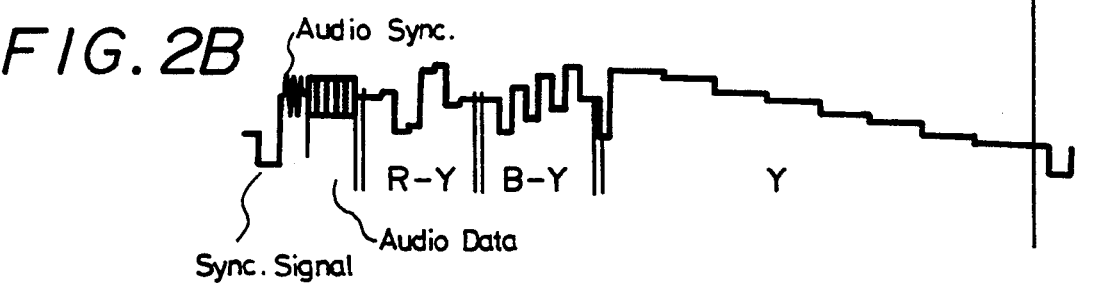

Thus, a luminance signal Y, two color difference signals (R−Y/B−Y), the audio data signal, the synchronizing signal and the total synchronizing signal shown, for example, in FIG. 2A, supplied to the A/D converter 8 are processed in a timebase-compression or the like to provide a signal shown in FIG. 2B, this signal being derived from the mixing circuit 20.

The signal from the mixing circuit 20 is supplied to a selector 21 and is also fed through a low-pass filter 22 or 23 to the selector 21. A signal selected by the selector 21 is supplied through a pre-emphasizing circuit 24 to an FM modulator 25 and is thereby modulated to an FM signal. This FM signal is supplied to an optical pickup head device 26, and a laser beam intermittently illuminates an optical disk 27 under the control of the FM signal.

Further, a central processing unit (CPU) 28 is provided to perform the servo control operation. The CPU 28 forms a servo command signal from a command signal from a main CPU 29, which will be referred to later, and a signal from the timing generating circuit 14. This servo command signal is supplied to a servo circuit 30 and the servo circuit 30 performs the control operations, such as moving the optical pickup head device 26 to a recording and reproducing apparatus (not shown) and so on. Also, this servo circuit 30 performs the control operations such as the control of a spindle motor 31 in order to rotate the optical disk 27 at a constant angular velocity and so on.

In this fashion, the video and audio signals applied to the input terminals 1, 5 and 17 are recorded on the optical disk 27, while signals are reproduced from the optical disk 27 as follows.

Upon reproduction, the reference oscillator 13 is self-oscillated and an oscillated signal therefrom is supplied to the timing generating circuit 14. The signal from the timing generating circuit 14 is supplied to the CPU 28 for servo-control, whereby the optical pickup head device 26 and the spindle motor 31 are servo-controlled by the signal from the servo circuit 30.

Then, a signal reproduced by the optical pickup head device 26 is supplied through an equalizer 32 to an FM-demodulator 33, in which the reproduced signal is demodulated to provide the signal formed by the above-mentioned timebase-compression or the like. The thus demodulated signal is supplied through a de-emphasizing circuit 34 to a selector 35, and also a signal from the de-emphasizing circuit 34 is supplied through a low-pass filter 36 or 37 to the selector 35.

A signal selected by this selector 35 is supplied to an A/D converter 38, and a converted digital signal is supplied to a memory 39.

Also, an output signal from the equalizer 32 and a signal selected by the selector 35 are supplied to a dropout (DO) detecting circuit 40, and a signal from the dropout detecting circuit 40 is supplied to a dropout pulse generating circuit 41 to generate a pulse signal whose duration corresponds to a dropout period. The dropout pulse signal from the dropout generating circuit 41 is supplied to a dropout compensating circuit 42, and a signal from the dropout compensating circuit 42 is supplied to the memory 39, to thereby compensate for a dropout in a reproduced signal.

Further, the signal selected by the selector 35 is supplied to a synchronizing (sync.) separating circuit 43, and a signal from the sync. separating circuit 43 is supplied to a reproducing clock generating circuit 44 to generate a clock signal synchronized with a reproduced signal. The clock signal from the generating circuit 44 and the signal from the timing generating circuit 14 are supplied to a memory control circuit 45, and then the A/D converter 38, the memory 39 and a D/A converter 46 which is supplied with a signal from the memory 39 are driven by the signals from the memory control circuit 45.

Thus, the signal formed by the above-mentioned timebase-compression and so on is separated and restored to the original luminance signal, the two color difference signals and the audio data signal by a timebase-expansion and so on. The restored luminance/color difference signal is supplied to a sync. mixing circuit 47 wherein the sync. signal from the reference oscillator 13 is mixed thereto. A signal from the mixing circuit 47 is supplied a selector 48, and is also converted into the three primary color signals by a matrix circuit 49 which are then fed to the selector 48. The luminance signal and the two color difference signals or the three primary color signals selected by the selector 48 are delivered to an output terminal 50.

Also, the luminance/color difference signals from the sync. mixing circuit 47 are supplied to an encoder 51, thereby converted into an arbitrary composite color video signal. Incidentally, a subcarrier signal and a burst gate signal from the reference oscillator 13 are supplied to the encoder 51. A signal from the encoder 51 is fed to an output terminal 52.

Further, a signal from the D/A converter 46 and an arbitrary timing signal from the control circuit 45 are supplied to an audio data signal separating circuit 53, and a separated audio data signal is supplied to a PCM demodulator 54, in which it is demodulated to provide left and right stereo audio signals. The left and right stereo audio signals demodulated are supplied to an output terminal 55.

Furthermore, in this video disk recording apparatus, the servo CPU 28 generates a position signal which indicates the position (radius position) at which the optical pickup head device 26 reproduces and/or reproduces the optical disk 27. This position signal from the CPU 28 is supplied to the selector 21 and the FM modulator 25 of the recording system and to the equalizer 32, the FM-demodulator 33 and the selector 35 of the reproducing system.

Figure 3:
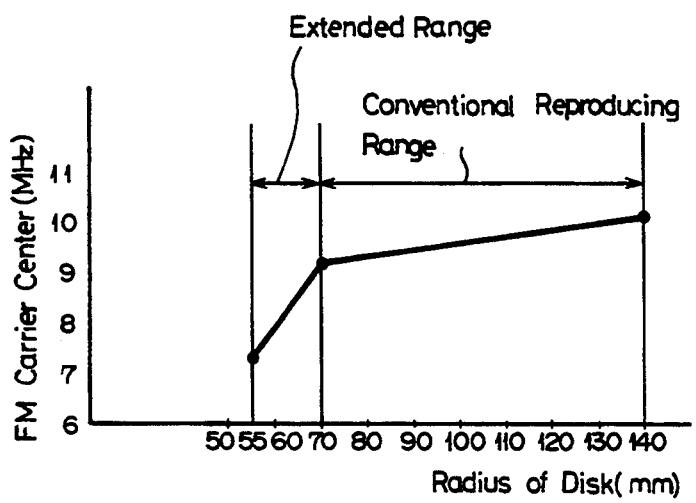
FIG. 3 is a characteristic graph illustrating the change of inclination of the FM carrier.
Figure 4A:
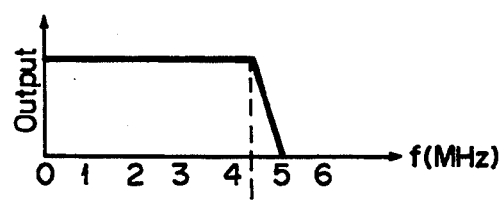
FIGS. 4A and 4B are characteristic graphs to which references will be made in explaining the condition that a frequency characteristic of the recording signal is limited.
Figure 4B:
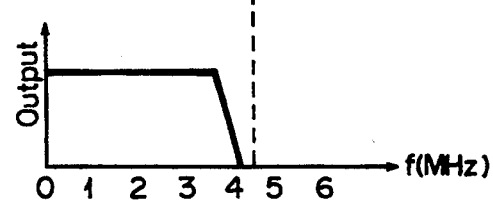

Thus, the carrier frequency is controlled in the FM modulator 25, the equalizer 32 and the FM-demodulator 33 as, for example, shown in FIG. 3. The original signals or the signals passed through the low-pass filter 22 or the low-pass filters 23, 36 or 37 are selected by the selectors 21 and 35. If a frequency characteristic of the original signal is as, for example, shown in FIG. 4A, the frequency characteristic is limited in the range of the radius from 55 to 70 mm as shown in FIG. 3B. Incidentally, if a plurality of low-pass filters are provided, a plurality of characteristics shown in FIG. 4B are provided.

As described above, according to the above-mentioned apparatus, the signal is recorded on the inner peripheral side from the limit of the recording on the optical disk to prolong the recording time and the recording characteristic of this range is gradually changed to conceal the change of the image quality of the reproduced picture, whereby the recorded information of a desired duration can be effected satisfactorily.

More specifically, in accordance with the above-mentioned apparatus, in the recording and reproduction of the video signal in the range extended exceeding the inner peripheral side of the optical disk, the image quality of the reproduced picture is deteriorated more or less by the lowered FM carrier frequency or the like. The degree in which the image quality of the reproduced picture is deteriorated as described above is in a acceptable range for the viewer, which can provide a desired recording time. Further, since the recording characteristics in this range are changed gradually, the change of the image quality can be concealed and the recording and reproduction can be performed successively.

Incidentally, in the above-mentioned apparatus, if an address signal is inserted into, for example, the recording signal, detected by a detecting circuit 56 and a detected signal of this address signal is supplied through an address decoder 57 to the main CPU 29 to thereby perform the control operation, the position signal of the optical pickup head device 26 in the reproduction mode may be formed from the address signal. Furthermore, the main CPU 29 may control the operations of respective portions in response to control commands issued from an operation panel (not shown) by the user or may display the control contents thereof on a display panel (not shown).

Therefore, according to the above-mentioned apparatus, it becomes possible to record and reproduce the single side of the optical disk for 30 minutes by utilizing the optical disk of, for example, 30 cm in diameter which is rotated at a constant angular velocity.

As set forth above, according to the present inventions, the signal is recorded on the inner peripheral side than the inner limit of the recording on the optical disk to prolong the recording time and the recording characteristic in this ravage is gradually changed to conceal the change of the image quality of the reproduced picture, whereby the recorded information of a desired duration can be effected satisfactorily.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

I claim as my invention:

1. An apparatus for recording an information signal having a given frequency range on a disk by a laser beam, comprising:

rotating means for rotating the disk with a constant angular velocity;

modulator means for frequency-modulating a carrier signal having a given frequency by the information signal; and recording means for recording the frequency-modulated carrier signal on the disk by the laser beam, wherein the disk has a conventional recording area and an extended recording area positioned at an inner side of the conventional recording area, wherein the carrier signal has a changing frequency characteristic inclination within the extended recording area which frequency characteristic inclination is steeper than the frequency characteristic inclination of the carrier signal within the conventional recording area, and means for lowering the frequency of the carrier signal and narrowing the frequency range of the information signal when the laser beam is positioned at the extended recording area.

2. An apparatus according to claim 1, wherein the frequency range of the information signal is gradually narrowed in accordance with the position of the laser beam in the extended recording area.

3. An apparatus as according to in claim 1, wherein the rotating means rotates the disk with a same constant angular velocity at all radial positions of the recording means with respect to the disk.

4. An apparatus according to claim 2, wherein the information signal further comprises an audio data signal and a sync. signal.

5. An apparatus for recording an information signal having a given frequency range on a disk by a laser beam, comprising:

rotating means for rotating the disk with a constant angular velocity;

wherein the disk has a conventional recording area and an extended recording area positioned at an inner side of the conventional recording area and the conventional recording area is in the range of radius from about 70 mm to 140 mm and the extended recording area is in the range of radius from about 55 mm to 70 mm of the disk;

modulator means for frequency-modulating a carrier signal having a given frequency by the information signal, wherein the carrier signal has a changing frequency characteristic inclination within the extended recording area which frequency characteristic inclination is steeper than the frequency characteristic inclination of the carrier signal within the conventional recording area;

recording means for recording the frequency-modulated carrier signal on the disk by the laser beam; and means for lowering the frequency of the carrier signal and narrowing the frequency range of the information signal when the laser beam is positioned at the extended recording area.

6. An apparatus as according to in claim 5, wherein the rotating means rotates the disk with a same constant angular velocity at all radial positions of the recording means with respect to the disk.

7. An apparatus for recording an information signal having a given frequency range on a disk by a laser beam, comprising:

rotating means for rotating the disk with a constant angular velocity;

modulator means for frequency-modulating a carrier signal having a given frequency by the information signal;

recording means for recording the frequency-modulated carrier signal on the disk by the laser beam;

wherein the disk has a conventional recording area and an extended recording area positioned at an inner side of the conventional recording area, wherein the carrier signal has a changing frequency characteristic inclination within the extended recording area which frequency characteristic inclination is steeper than the frequency characteristic inclination of the carrier signal within the conventional recording area;

means for lowering the frequency of the carrier signal and gradually narrowing the frequency range of the information signal when the laser beam is positioned at the extended recording area in accordance with the position of the laser beam in the extended recording area; and wherein the information signal to be recorded comprises a time-compressed color difference signal and a time-compressed luminance signal.

8. An apparatus as according to in claim 7, wherein the rotating means rotates the disk with a same constant angular velocity at all radial positions of the recording means with respect to the disk.

* * * * *